United States Patent
Bouchard

(10) Patent No.: US 7,994,725 B2
(45) Date of Patent: Aug. 9, 2011

(54) FLOATING SWITCH CONTROLLING LED ARRAY SEGMENT

(75) Inventor: Guy P Bouchard, Beverly, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 237 days.

(21) Appl. No.: 12/266,387

(22) Filed: Nov. 6, 2008

(65) Prior Publication Data

US 2010/0109557 A1 May 6, 2010

(51) Int. Cl.
*H05B 37/00* (2006.01)
*H05B 41/00* (2006.01)

(52) U.S. Cl. ............ 315/122; 315/123; 315/185 R

(58) Field of Classification Search ........... 315/122, 315/123, 185 R, 295, 128
See application file for complete search history.

(56) References Cited

U.S. PATENT DOCUMENTS

| | | | | |
|---|---|---|---|---|
| 5,959,413 A * | 9/1999 | Komarek et al. | ............ | 315/306 |
| 6,137,816 A * | 10/2000 | Kinbara | ............ | 372/29.012 |
| 7,317,403 B2 * | 1/2008 | Grootes et al. | ............ | 340/815.45 |
| 7,339,323 B2 * | 3/2008 | Bucur | ............ | 315/128 |
| 7,564,666 B2 * | 7/2009 | Ball et al. | ............ | 361/91.5 |
| 7,648,326 B2 * | 1/2010 | Santele et al. | ............ | 414/723 |
| 2005/0243022 A1 * | 11/2005 | Negru | ............ | 345/46 |
| 2007/0108843 A1 | 5/2007 | Preston et al. | | |
| 2007/0258176 A1 * | 11/2007 | Ball et al. | ............ | 361/56 |

FOREIGN PATENT DOCUMENTS

| EP | 1 006 506 A | 6/2000 |
|---|---|---|
| EP | 1 322 139 A | 6/2003 |
| EP | 1 589 519 A | 10/2005 |

OTHER PUBLICATIONS

European Patent Office, Extended European Search Report and European Search Opinion, Jan. 22, 2010, Munich, Germany.
Unknown, "LE W D1A," Published by OSRAM Opto Semiconductors GmbH, Nov. 27, 2006, 14 pages.
Unknown, "LW W5SN," Published by OSRAM Opto Semiconductors GmbH, Apr. 6, 2006, 18 pages.

* cited by examiner

*Primary Examiner* — Edward Tso
*Assistant Examiner* — Ramy Ramadan
(74) *Attorney, Agent, or Firm* — Shaun P. Montana

(57) ABSTRACT

A control circuit used in a lamp system. The lamp system has a first and a second light emitting diode (LED) connected together in series. The control circuit includes a current source for connecting to the first LED to provide a regulated drive current to the first and second LEDs in order to illuminate the LEDs. The control circuit includes a switching component for connecting in parallel with the first LED to divert the driver current from the first LED and provide the driver current to the second LED when the switching component is activated. The control circuit includes a controller for selectively activating the switching component in order to selectively extinguish the first LED.

18 Claims, 4 Drawing Sheets

FLOATING SWITCH CONTROLLING LED ARRAY SEGMENT

FIELD OF THE INVENTION

The present invention generally relates to a control circuit for selectively de-energizing lamps that are electrically connected together in series in a lamp system.

BACKGROUND OF THE INVENTION

Light emitting diodes (LEDs) are semiconductor devices that generate light when electrical energy (e.g., current, voltage) is applied to the device. LED light output is proportional to the LED current, and thus, a current source is generally used to drive the LEDs. Advances in light emitting diodes (LEDs) have made LEDs very attractive for use in vehicles because of their long operation life, higher efficiency and low profile. For example, LEDs may be used in a headlamp system of a motor vehicle. A first set (e.g., string) of the LEDs are illuminated when the headlamp system is operated in a low beam operation mode, a second set (e.g., string) of the LEDs are illuminated when the headlamp system is operated in a high beam operation mode, and a third set (e.g., string) of the LEDs are illuminated when the headlamp system is operated in a daytime running lights operation mode.

The first, second, and third sets of LEDs may be arranged as two or more strings of LEDs connected in a parallel. The strings of LEDs are selectively illuminated in order to operate the headlamp system in a particular mode. Due to the wide unit-to-unit variation of LED forward voltage, parallel LED strings require a current limiter or other current regulator in series with each string in order to force current sharing amongst the strings. Resistors are commonly used as current limiters and series pass transistors are used as linear regulators in low power LED strings. However, the amount of power dissipated by the resistor or series pass transistor increases as the current increases in the LED string. Thus, resistors are not efficient current regulators for LEDs used in higher power applications such as motor vehicle headlamp systems. In these higher power applications, each LED string requires a low loss circuit, such as a switching power converter, for regulating the current. These switching current regulators are significantly more expensive than resistors or series pass transistors and thus implementing a switching regulator in each of multiple parallel strings increases the cost of the headlamp system.

SUMMARY OF THE INVENTION

Embodiments of the invention independently control segments of a string of light emitting diodes (LEDs) which are driven from a single current regulator. In particular, embodiments of the invention selectively illuminate or extinguish segments of the LED string. In an embodiment of the invention, a segment of the LED string is alternatively illuminated and extinguished in order to vary the intensity of the LED output. Additionally, an embodiment of the invention monitors one or more of the segments for fault occurrences and bypasses a segment when a fault occurrence has been detected in the segment.

Other objects and features will be in part apparent and in part pointed out hereinafter.

BRIEF DESCRIPTION OF THE DRAWINGS

Corresponding reference characters indicate corresponding parts throughout the drawings.

DESCRIPTION

Embodiments of the invention generally relate to a control circuit used with a lamp system having a plurality of series-connected lamps. In one embodiment, the control circuit includes a single current source (e.g. a switching power converter) for connecting to the lamp series to provide regulated drive current to the lamps. The control circuit includes a switching component adapted for connecting across a lamp or an adjacent set of the lamps for diverting the drive current from the set of lamps when the switching component is activated. The control circuit includes a controller for selectively activating the switching component in order to operate the set of lamps. Thus, an aspect of the present invention allows lamps driven from a single current regulator to be selectively illuminated. Another aspect of the present invention allows a set of the lamps driven from a single current regulator to be bypassed when a fault has occurred in the lamp set.

Figure 1:
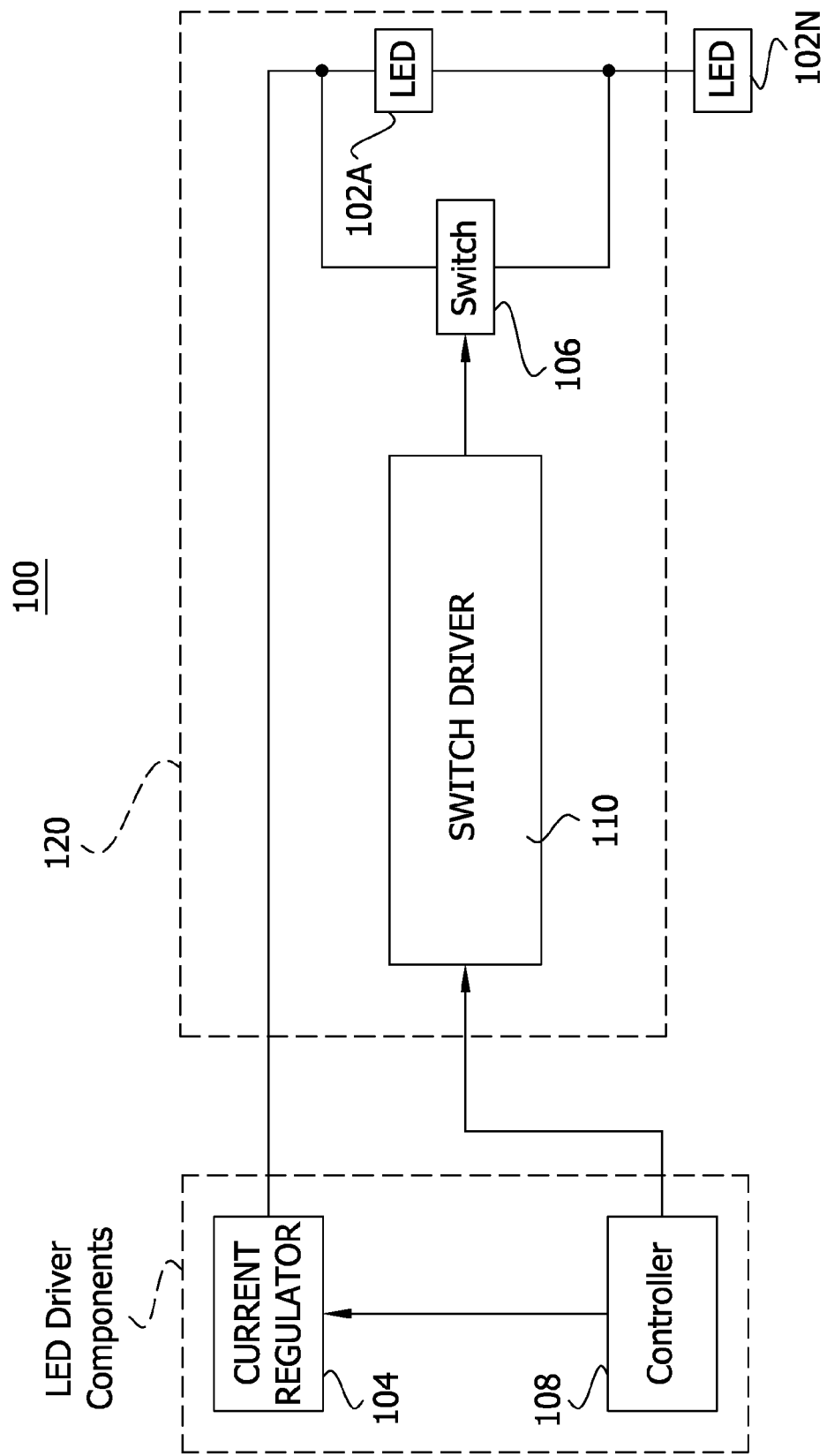
FIGS. 1-2 are block diagrams of lamp systems according to embodiments of the invention.

FIG. 1 illustrates an exemplary lamp system 100 according to an embodiment of the invention. The lamp system 100 includes a string of light-emitting diodes (LEDs) 102. As used herein, a string of LEDs refers a plurality of LEDs 102 sequentially connected cathode-to-anode so that current may flow in a single path through the sequence of LEDs 102. The illustrated LED string includes a first LED 102A and a second LED 102N. The first LED 102A and the second LED 102N each represent a set of one or more series-connected LEDs 102. In one embodiment, the LEDs 102 are high-power (e.g., greater than or equal to about 1 Watt) LEDs.

A current source (e.g., current regulator) 104 is connected to the first LED 102A to provide a regulated drive current to the first and second LEDs 102A, 102N for illuminating the LEDs 102A, 102N. For example, in a high-current application, the current source 104 may be configured to provide a current of at least about 350 milliamps. In one embodiment, the current source 104 includes a power converter adapted for connecting to a power supply. The power converter has a particular topology for use with the power supply to provide constant current to the LED string. The topology may be buck, boost, or combination buck and boost topology and is selected based on the power supply and the electrical characteristics of the LEDs 102 (e.g., forward voltage). For example, an LED driver having a boost buck topology is used to drive an LED string wherein the forward voltages of the LEDs may overlap the available voltage from the power supply. The current source 104 may also include a filtering component (e.g., C4 in FIG. 3, C14, C54 in FIG. 4), such as filtering capacitor, for filtering the drive current that before it is provided to the LEDs 102.

A switching component (e.g., switch) 106 is connected across (i.e., in parallel with) the first LED 102A. The switch 106 has an active state and an inactive state. In the active state, the switch 106 is closed (e.g., on) providing a current path from the current source 104 to the anode of the second LED 102N that bypasses the first LED 102A. Thus, when the switch 106 is operating in the active state, current provided from the current source 104 is diverted from the first LED 102A and the first LED 102A is not illuminated (e.g., de-energized, extinguished) so that only LED 102N and any other LEDs, such as LED 102C in series with LED 102N is illuminated. In the inactive state, the switch 106 is open (e.g., off). Accordingly, when the switch 106 is operating in the inactive state, current provided from the current source 104 flows to the first LED 102A and energizes it in order to illuminate the first LED 102A. It is contemplated that the switch 106 may be alternatively configured without departing from the scope of the invention.

In one embodiment, the energizing of the second LED 102N is independent from the state of the switch 106. When the switch 106 is operating in the active state, current is provided from the current source 104 to the second LED 102N via the switch 106. When the switch 106 is operating in the inactive state, current is provided from the current source 104 to the second LED 102N via the first LED 102A. In another embodiment, the energizing of one LED may be a function of the state of a switch corresponding to another LED.

A controller 108 (e.g., microcontroller, programmable logic device, processor, microprocessor, computing device) is connected to the switch 106 for controlling the state of the switch 106 in order to selectively energize the first LED 102A. The controller 108 may also be connected to and/or responsive to other components of the lamp system 100 for controlling those components. In the illustrated embodiment, the controller 108 is connected to the power converter for commanding a particular current supplied to the LEDs 102. For example, the controller 108 may select the particular current based on an input voltage value, a state of an input enable line, a measured temperature, etc. The controller may also disable the power converter. For example, the controller may disable the power converter based on one or more fault conditions, such as a short circuit or an overvoltage condition. Alternatively, the controller 108 may be exclusively dedicated to controlling the switch 106.

The illustrated control circuit includes a switch driver 110 connected between the controller 108 and the switch 106. The switch driver 110 receives a control signal from the controller 108 indicating a selected state of operation for the switch 106. The switch driver 110 adjusts the control signal so that it will operate the switch 106 in the selected state of operation and provides the adjusted control signal to the switch 106. Together, the switch driver 110, the switch 106, and the first LED 102A form a first light emitting unit 120. Although the illustrated lamp system 100 only shows one lighting emitting unit 120, one or more additional light emitting units may be connected in series with each other between the first light emitting unit 120 and the second LED 102N.

Figure 2:
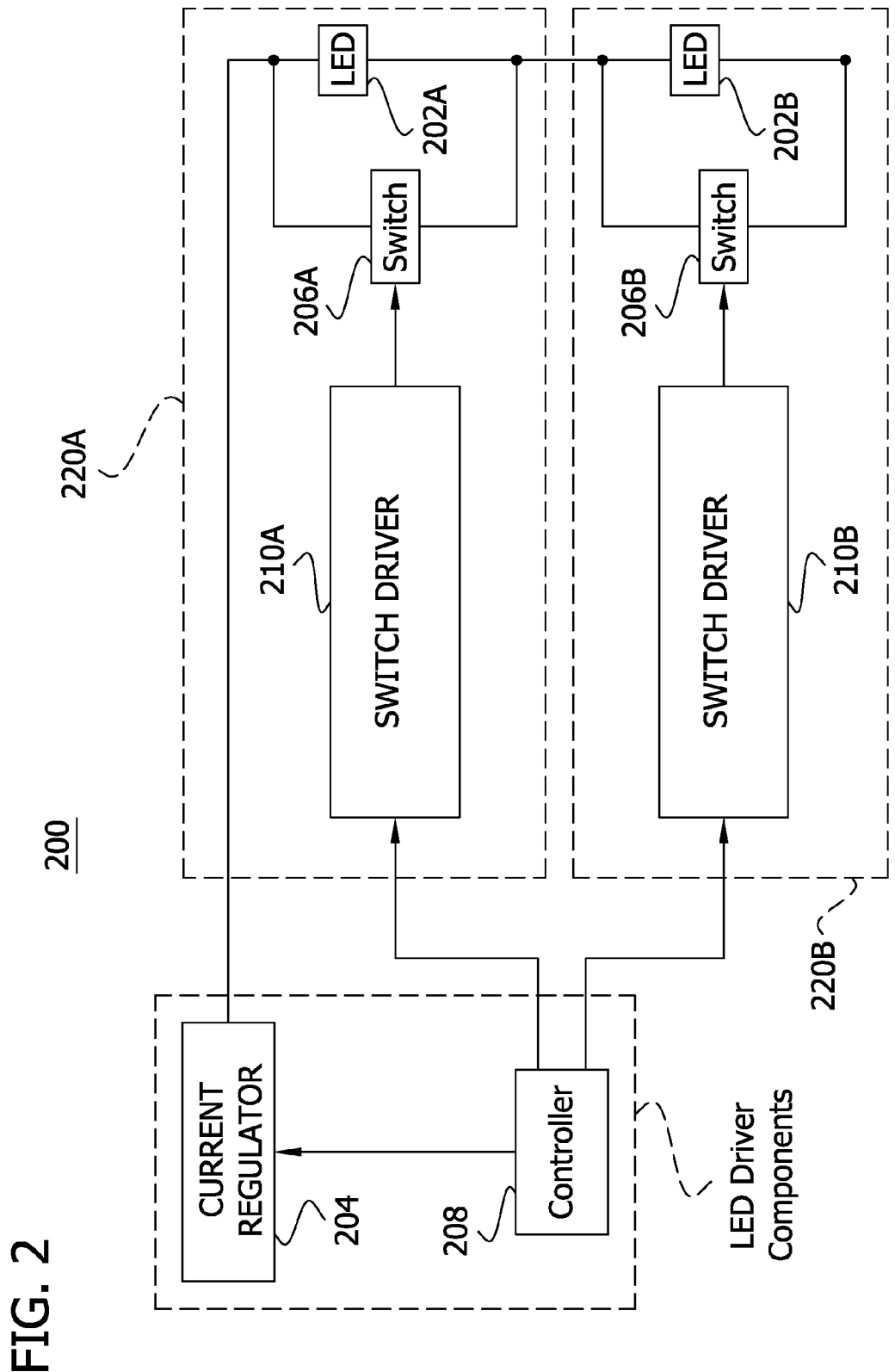

Referring to FIG. 2, in another embodiment, the control circuit is additionally configured for selectively energizing the second LED. The illustrated lamp system 200 includes a single current source 204, a controller 208, a first LED 202A, and a second LED 202B, as discussed above in connection with the lamp system 200 illustrated in FIG. 2. As mentioned above, the control circuit includes a first switch 206A connected across the first LED 202A and a first switch driver 210A connected between the controller 208 and the first switch 206A. Together, the first LED 202A, the first switch 206A, and the first switch driver 210A form a first light emitting unit 220A. Additionally, the control circuit includes a second switch 206B connected across the second LED 202B and a second switch driver 210B connected between the controller 208 and the second switch 206B. Together, the second LED 202B, the second LED switch 206B, and the second switch driver 210B form a second light emitting unit 220B.

The first light emitting unit 220A is connected to current source 204 for receiving current from the current source 204. The second light emitting unit 220B is connected in series with the first light emitting unit 220A for receiving current from the current source 204 via the first light emitting unit 220A. In particular, the first and second switches 206 each have an active and an inactive state. When the first switch 206A is in the active state, the first switch 206A is closed (e.g., on) providing a current path from the current source 204 to the second light emitting unit 220B that bypasses the first LED 202A. Thus, when the first switch 206A is operating in the active state, current provided from the current source 204 is diverted from the first LED 202A so the first LED 202A is not illuminated (e.g., de-energized, extinguished) and the current is delivered to the second light emitting unit 220B via the first switch 206A. When the first switch 206A is in the inactive state, the first switch 206A is open (e.g., off). Accordingly, when the first switch 206A is operating in the inactive state, current provided from the current source 204 flows to the first LED 202A and energizes it in order to illuminate the first LED 202A. The energized first LED 202A conducts the current to the second light emitting unit 220B and, thus, the second light emitting unit 220B receives the current via the first LED 202A.

When the second switch 206B is in the active state, the second switch 206B is closed (e.g., on) providing a current path from the first light emitting unit 220A to ground that bypasses the second LED 202B. Thus, when the second switch 206B is operating in the active state, current provided from the current source 204 via the first light emitting unit 220A is diverted from the second LED 202B so the second LED 202B is not illuminated (e.g., de-energized, extinguished). When the second switch 206B is in the inactive state, the second switch 206B is open (e.g., off). Accordingly, when the second switch 206B is operating in the inactive state, current provided from the current source 204 via the first light emitting unit 220A flows to the second LED 202B and energizes it in order to illuminate the first LED 202A. Although the illustrated lamp system 200 only shows two light emitting units 220A and 220B, the lamp system 200 may include one or more additional light emitting units between the second light emitting unit 220B and the ground so that each of the light emitting units 220 is in series with each other light emitting unit 220.

Each of the light emitting units 220 is connected to the controller 208 via a separate control line so that each of the switches 206 can be independently operated. Accordingly, in the illustrated embodiment, the controller 208 includes a first output (e.g., control line) for transmitting a first control signal to the first light emitting unit 220A indicating a selected state of operation for the first switch 206A. The first switch driver 210A receives the first control signal and adjusts the first control signal so that it will operate the first switch 206A in the selected state of operation and provides the adjusted first control signal to the first switch 206A. Similarly, the controller 208 includes a second output for transmitting a second control signal to the second light emitting unit 220B indicating a selected state of operation for the second switch 206B. The second switch driver 210B receives the second control signal and adjusts the second control signal so that it will operate the second switch 206B in the selected state of operation and provides the adjusted second control signal to the second switch 206B.

Figure 3:
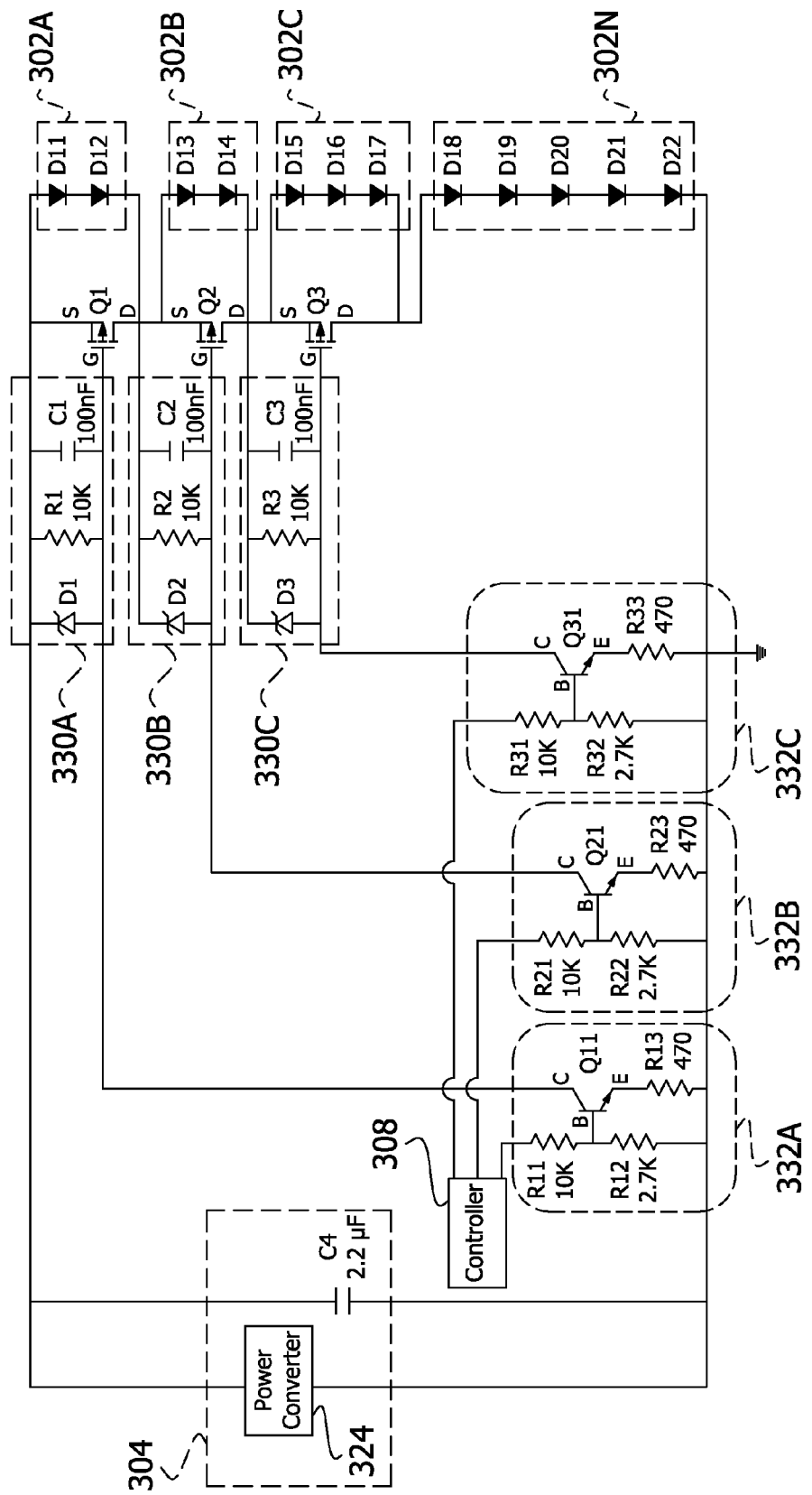
FIG. 3 is a circuit diagram illustrating a headlamp system according to an embodiment of the invention.

Referring to FIG. 3, in one embodiment, the lamp system 300 is a headlamp system 300 for a vehicle such as a motor vehicle. The lamp system 300 includes a current regulator 304, a controller 308, and a string of LEDs 302 in accordance with the corresponding components discussed above in connection with the lamp systems 100 and 200. The string of LEDs 302 is segmented into four sets of series-connected LEDs. The first set of LEDs 302A (hereinafter "first LED") includes diodes D11 and D12, the second set of LEDs 302B (hereinafter "second LED") includes diodes D13 and D14, the third set of LEDs 302C (hereinafter "third LED") includes diodes D15, D16, and D17, and the fourth set of diodes 302D includes diodes D18, D19, D20, D21, and D22. The lamp system 300 includes a first light emitting unit having the first LED 302A and a corresponding first switch Q1 connected across the first LED 302A and a corresponding first switch driver 330A, 332A connected between the controller 308 and the first switch Q1. Similarly, the lamp system 300 includes a second light emitting unit having the second LED 302B, a second switch Q2, and a second switch driver 330B, 332B; and a third light emitting unit having the third LED 302C, a third switch Q3, and a third switch driver 330C, 332C.

The first, second, and third light emitting units and a fourth light emitting unit 302N are sequentially connected in series between the power converter and ground for receiving current from the current regulator 304. As discussed in connection with lamp systems 100 and 200, each of the switches Q1, Q2, Q3 has an active state providing an alternative current path to divert drive current from the corresponding LED 302 and an inactive state in which no such alternative current path is provided. Thus, when a particular switch Q1, Q2, Q3 is operated in the active state the drive current is provided to the corresponding LED 302 and the corresponding LED 302 is illuminated. Alternatively, when a particular switch Q1, Q2, Q3 is activated in the inactive state, the drive current is diverted (e.g., bypassed) from the corresponding LED 302 and the corresponding LED 302 is not illuminated. Each of the switches Q1, Q2, Q3 is separately connected to the controller 308 via the corresponding switch driver 330, 332 so the controller 308 is able to independently control the operating state of each of the switches Q1, Q2, Q3.

In the illustrated embodiment, the first switch Q1 is a transistor such as a p-type metal-oxide-semiconductor field-effect transistor ("P-Channel MOSFET"). For example, the first switch Q1 may be the FQD17P06 60 Volt P-Channel MOSFET available from Fairchild Semiconductor Corporation. The first switch Q1 has a source terminal S, a gate terminal G, and a drive terminal D. The first LED 302A is connected between the source and the drain terminals.

The first switch driver 330A, 332A is connected between the controller 308 and the first switch Q1 to receive a control signal ("first control signal) from the controller 308 and adjust the first control signal for operating the first switch Q1 in the selected state of operation. For example, the first control signal may use a high value (e.g., 5 Volts) to place the switch Q1 in the active state and a low value (e.g., 0 Volts) to place the switch Q1 in the inactive state. In the illustrated embodiment, the first switch driver 330A, 332A includes a gate drive circuit 330A and a level-shift circuit 332A.

The gate drive circuit 330A is connected between the source and drain terminals of the first switch Q1 for providing a voltage (i.e., gate voltage, $V_G$) to the gate terminal G to turn the first switch Q1 on (e.g., activate the switch Q1) or off (e.g., de-activate the switch Q1). In particular, the gate driver circuit 330A includes components a diode D1 (e.g., 9.1 Volt Zener Diode), a resistor R1 (e.g., 10 kOhm resistor), and a capacitor C1 (e.g., 100 nFarad capacitor) each connected in parallel between the source and drain terminals of the first switch Q1.

The level-shift circuit 332A is connected between the gate drive circuit 330A and the controller 308 for receiving a control signal ("first control signal) from the controller 308 and shifting the voltage level of the control signal so that the gate voltage $V_G$ is high enough to fully switch the first switch Q1 on or off as indicated by the first control signal. In particular, the level-shift circuit 332A includes a switch Q11, such as a bipolar junction transistor having a collector junction C, a base junction B, and an emitter junction E (e.g., 2N5551 NPN General Purpose Amplifier available from National Semiconductor). The collector junction C of the transistor Q11 is connected to the gate drive circuit 330A. The level-shift circuit 332A includes a voltage divider, R11 (e.g., 10 kOhm resistor) and R12 (e.g., 2.7 kOhm resistor), connected to the base junction B of the transistor Q11. A resistor R13 (e.g., 470 Ohm resistor) is connected between the emitter junction E of the transistor Q11 and the ground.

In operation, when the first control signal has a low value, the transistor Q11 is off allowing the resistor R1 to pull the gate terminal G of the first switch Q1 up to the source terminal S of the first switch Q1 causing a high impedance across the source and drain terminals of the first switch Q1. The high source-to-drain impedance allows the drive current to flow through and illuminate the first LED 302A. Alternatively, when the first control signal has a high value, the transistor Q11 is on (e.g., conducting), which pulls down on the gate terminal G of the first switch Q1 causing a low impedance across the source and drain terminals of the first switch Q1. The low source-to-drain impedance provides an alternative current path for the drive current so that the drive current is diverted away from the first LED 302A and thus is not illuminated.

In the illustrated embodiment, the second and third light emitting units include components corresponding to those discussed above in connection with the first light emitting unit. Corresponding components are indicated in FIG. 3 with corresponding reference numbers.

Referring generally the lamp systems 100, 200, and/or 300, in one embodiment the controller may control a particular switch in order to dim the corresponding LED. More particularly, the controller oscillates the switch between the active and inactive state in order to alternately illuminate and extinguish the LED. A dimming effect is produced by alternately illuminating and extinguishing the LED (e.g., varying intensity of the LED) at particular frequency (e.g. 250 Hz). The apparent brightness of the LED is a function of a length of time that the LED is illuminated ("illumination period") relative to a length of time that the LED is extinguished ("extinction period").

In order to dim the LED to a particular apparent intensity (noted herein as a "particular intensity"), the controller generates a control signal that is pulse width modulated according to the particular intensity. The pulse width modulated signal has a duty cycle representing the ratio between the pulse duration (e.g., width of the pulse) and the period of a single waveform. In one embodiment, the pulse duration of the control signal represents the illumination period and the pulse duration is increased in order to increase (e.g., brighten) the intensity of the LED and is decreased in order to decrease (e.g., dim) the intensity of the LED. Accordingly, the duty cycle of the control signal is increased in order to (e.g., brighten) the intensity of the LED and is decreased in order to decrease (e.g., dim) the intensity of the LED. In an alternate embodiment, the pulse duration represents the extinction period and the pulse duration is increased in order to decrease (e.g., dim) the intensity of the LED and is decreased in order to increase (e.g., brighten) the intensity of the LED. Accordingly, the duty cycle of the control signal is decreased in order to decrease (e.g., dim) the intensity of the LED and is increased in order to increase (e.g., brighten) the intensity of the LED.

In one embodiment, the controller may additionally or alternatively include an input (not illustrated) for connecting to a user interface. The user interface allows a user to select whether one or more of the LEDs are illuminated. The controller receives the user's selection from the user interface via the input and generates the control signal(s) as a function of the input received from the user interface. In another embodiment, the controller may additionally or alternatively include an input for connecting to a sensing device. The sensing device senses a parameter. The controller receives an input signal from the sensing device indicative of the sensed parameter and generates the control signal(s) based on the sensed parameter.

Figure 4:
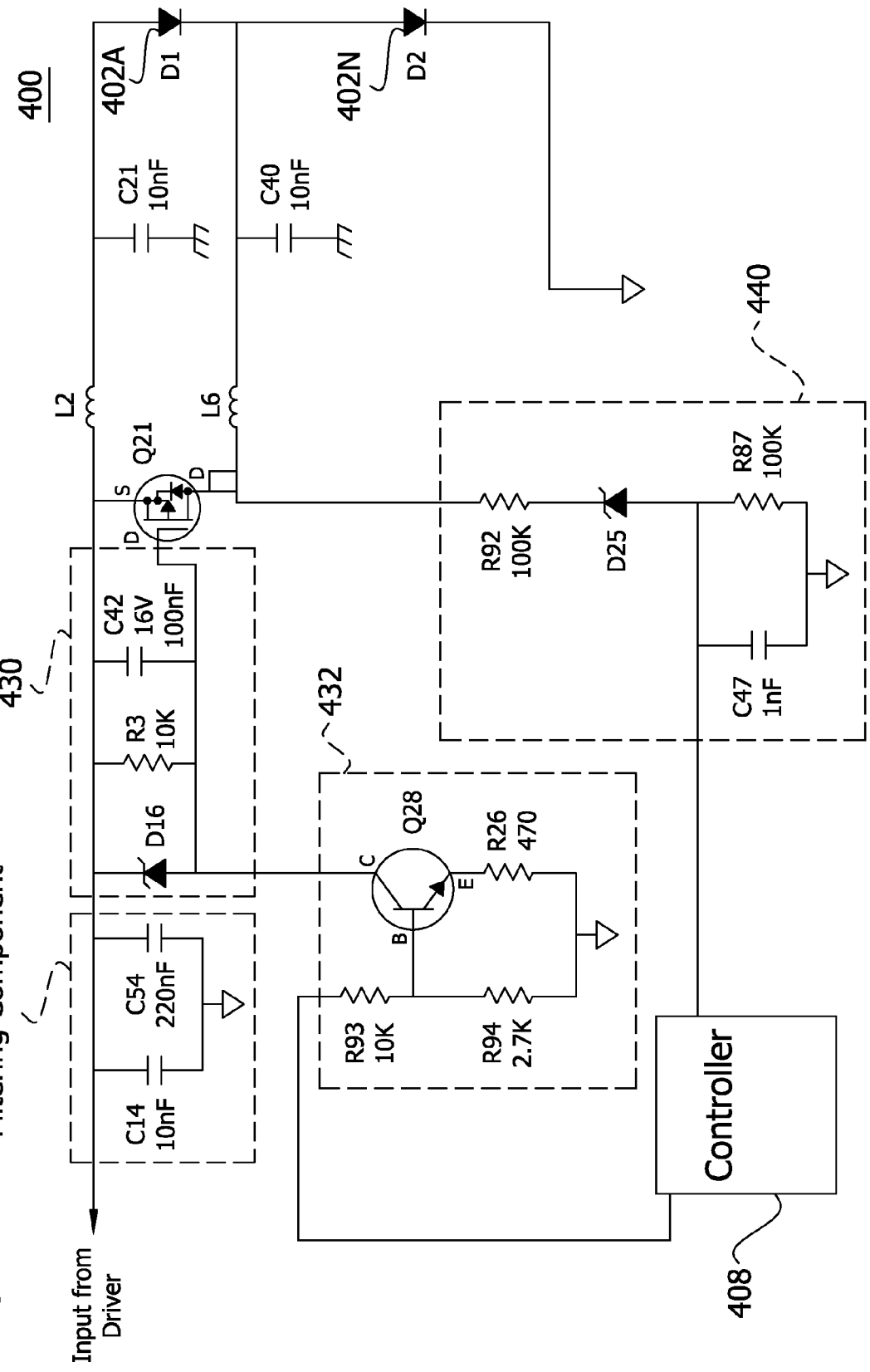
FIG. 4 is circuit diagram illustrating a lamp system having a voltage sensing component according to an embodiment of the invention.

FIG. 4 illustrates another embodiment of a lamp system 400 having a voltage sensing circuit 440. The lamp system 400 includes a current regulator having a power converter (not shown) and filtering capacitors C14 and C54. The lamp system 400 includes a first light emitting unit having a first LED 402A, a first switch Q21, and a first switch driver 430 and 432. A second LED 402N is connected in series with the first light emitting unit and a controller 408 is connected to the first light emitting unit for selectively activating the first LED 402A. These elements correspond to the similarly defined elements discussed above in connection with lamp systems 100, 200, and 300 and are indicated in FIG. 4 with corresponding reference numbers.

The voltage sensing circuit 440 is connected between the first and second LEDs 402A, 402N and to the controller 408. The voltage sensing circuit 440 includes R92 (e.g., 100 kOhm resistor), D25 (Zener diode), R87 (e.g., 100 kOhm resistor), and C47 (1 nFarad resistor). The voltage sensing circuit 440 is adapted to sense a potential across the first LED 402A and to generate a signal indicating whether a fault (e.g., failure) has occurred in the first LED 402A based on the sensed potential. The controller 408 receives the signal generated by the voltage sensing circuit 440 and activates the first switch Q21 when the sensed voltage is indicative of a fault occurrence. For example, the voltage sensing circuit 440 may generate a signal having a low value (e.g., less than 0.8 Volts) to represent an open circuit fault occurrence has been sensed in the first LED 402A. Similarly, the voltage sensing circuit 440 may generate a signal having a high value (e.g., greater than or equal to 0.8 Volts) to represent that no fault occurrence has been sensed in the first LED 402A. Accordingly, the controller 408 may be configured to activate the first switch Q21 when the signal received from the voltage sensing circuit 440 is less than (or equal to) a pre-defined threshold value (e.g., low value). Other scenarios for fault detection and corrective action using the sensed voltage may be performed without departing from the scope of the invention.

In the illustrated embodiment, the voltage sensing circuit 440 receives a voltage signal from across the first LED 402A. The voltage signal is reduced as a function of resistors R92 and R87 and diode D25 and filtered via capacitor C47. The reduced and filtered voltage signal is provided to the controller 408. The controller 408 receives the reduced and filtered voltage signal and activates the first switch Q21 when the signal received from the voltage sensing circuit 440 is less than (or equal to) a pre-defined threshold value (e.g., 0.8 Volts).

In one embodiment, the lamp systems 100, 200, 300 and/or 400 may be headlamp systems for vehicles. A particular headlamp system may have a plurality of operating modes. For example, the headlamp system may have two or more of the following operating modes: low beam mode, high beam mode, and daytime running lights mode. The sets of LEDs (e.g., first LED, second LED, etc) are selectively illuminated as a function of the headlamp system operating mode. For instance, the controller may be configured to activate the first switch illuminating the first LED in order to operate the headlamp system in the low beam mode and to activate the second switch illuminating the second LED to operate the headlamp system in the daytime running lights mode. The controller may be further configured to activate both the first switch and the second switch illuminating the first and the second LEDs in order to operate the headlamp system in the high beam mode. The headlamp system may include additional or alternative operating modes and corresponding combinations of LED sets without departing from the scope of the invention.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the constructions, products, and methods without departing from the scope of the invention, it is intended that all matter contained in the above description and shown in the accompanying drawings shall be interpreted as illustrative and not in a limiting sense.

What is claimed is:

1. A control circuit for use in a lamp system, the lamp system having a first and a second light emitting diode (LED) connected together in series, the control circuit comprising:

a current source connected to the first LED to provide a regulated drive current to the first and second LEDs to illuminate said LEDs;

a switching component connected in parallel with the first LED to divert the drive current from the first LED and provide the drive current to the second LED when the switching component is activated;

a controller to selectively activate the switching component in order to selectively extinguish the first LED; and a voltage sensing circuit connected between the first and second LEDs to determine a potential across the first LED indicating whether an open circuit fault has occurred in the first LED, wherein the voltage sensing circuit includes a first resistor, a second resistor, a diode, and a capacitor, wherein the first resistor, the second resistor, and the diode reduce the potential across the first LED and the capacitor filters the reduced potential, and wherein the voltage sensing circuit provides the reduced and filtered potential to the controller;

wherein the controller is connected to the voltage sensing circuit and the switching component to activate the switching component when the reduced and filtered potential indicates that an open circuit fault has occurred in the first LED to allow the continued illumination of the second LED.

2. The control circuit of claim 1 wherein the switching component is a first switching component, and further comprising a second switching component connected in parallel with the second LED to divert the drive current from the second LED when the second switching component is activated, and wherein the controller is configured to selectively activate the first switching component and the second switching component independent of one another in order to selectively extinguish the first and second LEDs.

3. The control circuit of claim 1 wherein the first and second LEDs are adapted to conduct current having a value of at least about 350 milliAmps.

4. The control circuit of claim 1 wherein the first LED is a plurality of LEDs connected in series and wherein the second LED is a plurality of LEDs connected in series.

5. The control circuit of claim 1 wherein the controller is configured to selectively activate the switching component at a frequency and a duty cycle in order to vary an intensity of first LED.

6. A lamp system comprising:
   a current source to provide a regulated drive current;
   a first light emitting unit connected to the current source to receive the drive current from the current source, the first light emitting unit comprising:
      a first set of one or more light emitting diodes (LEDs) connected in series to illuminate responsive to receiving the drive current; and
      a first switching component connected in parallel with the first set of LEDs, the first switching component having an active state and an inactive state, wherein the first switching component diverts the drive current from the first set of LEDs when the first switching component is in the active state;
   a second light emitting unit connected in series with the first light emitting unit to receive the drive current via the first light emitting unit, the second light emitting unit comprising:
      a second set of one or more LEDs connected in series to illuminate responsive to receiving the drive current; and
      a second switching component connected in parallel with the second set of LEDs, the second switching component having an active state and an inactive state, wherein the second switching component diverts the drive current from the second set of LEDs when the second switching component is in the active state;
   a controller to control the state of the first and second switching components in order to selectively illuminate the first and second sets of LEDs;
   a user interface connected to the controller to receive an input from a user indicating a set of LEDs selected for illuminating, and wherein the controller controls the state of the first and second switching components in order to illuminate the user-selected set of LEDs; and
   a voltage sensing circuit connected between the first and second LEDs to determine a potential across the first LED indicating whether an open circuit fault has occurred in the first LED, wherein the voltage sensing circuit includes a first resistor, a second resistor, a diode, and a capacitor, wherein the first resistor, the second resistor, and the diode reduce the potential across the first LED and the capacitor filters the reduced potential, and wherein the voltage sensing circuit provides the reduced and filtered potential to the controller;
   wherein the controller is connected to the voltage sensing circuit and the switching component to activate the switching component when the reduced and filtered potential indicates that an open circuit fault has occurred in the first LED to allow the continued illumination of the second LED.

7. The lamp system of claim 6 wherein in the lamp system is a headlamp system for a vehicle having a low beam operating mode and a high beam operating mode, wherein the controller is configured to operate the first switching component in the active state and to operate the second switching component in the inactive state when the headlamp system is operating in the low beam operating mode, and wherein the controller is configured to operate the first switching component in the inactive state and to operate the second switching component in the active state when the headlamp system is operating in the high beam operating mode.

8. The lamp system of claim 6 wherein the controller is further configured to oscillate the first and second switching components between the active and inactive states in order to vary the intensity of the first and second sets of LEDs.

9. The lamp system of claim 6 further comprising a third light emitting unit connected in series with the first and second light emitting units to receive the drive current via the second light emitting unit, the third light emitting unit comprising:
   a third set of one or more LEDs connected in series to illuminate responsive to receiving the drive current; and
   a third switching component connected in parallel with the third set of LEDs, the third switching component having an active state and an inactive state, wherein the third switching component diverts the drive current from the third set of LEDs when the third switching component is in the active state; and
   wherein the controller is further configured to control the state of the third switching component in order to selectively illuminate the third set of LEDs.

10. The lamp system of claim 6 wherein the first switching component is a p-type metal-oxide-semiconductor field-effect transistor having a source terminal, a gate terminal, and a drain terminal, wherein the first set of LEDs is connected between the source terminal and the drain terminal, and the controller is connected to the gate terminal to provide a control signal to the first switching component to control the state of the first switching component.

11. The lamp system of claim 10 wherein the first light emitting unit further comprises a first switch driver connected between the controller and the gate terminal of the first switching component to adjust the control signal at the gate terminal in order to control the state of the first switching component.

12. The lamp system of claim 6 wherein the second switching component is a p-type metal-oxide-semiconductor field-effect transistor having a source terminal, a gate terminal, and a drain terminal, wherein the second set of LEDs is connected between the source terminal and the drain terminal, and the controller is connected to the gate terminal to provide a control signal to the second switching component to control the state of the second switching component.

13. The lamp system of claim 12 wherein the second light emitting unit further comprises a second switch driver connected between the controller and the gate terminal of the second switching component to adjust the control signal at the gate terminal in order to control the state of the second switching component.

14. The lamp system of claim 6 further comprising a third set of one or more LEDs connected in series with the first and second light emitting units to receive drive current from the second light emitting unit.

15. A lamp system comprising:
   a current source to provide a regulated drive current;
   a first set of one or more series-connected light emitting diodes (LEDs), the first set of LEDs connected to the current source to illuminate responsive to receiving the drive current from the current source;

a switching component connected in parallel with the first set of LEDs, the switching component having an active state and an inactive state, wherein the switching component diverts the drive current from the first set of LEDs when the switching component is in the active state;

a second set of one or more series-connected LEDs, the second set of LEDs connected to the first set of LEDs and connected to the switching component, the second set of LEDs to receive the drive current via the first set of LEDs when the switching component is in the inactive state and to receive the drive current via the switching component when the switching component is in the active state, wherein the second set of LEDs illuminates responsive to receiving the drive current;

a voltage sensing circuit connected between the first and second sets of LEDs to determine a potential across the first set of LEDs indicating whether an open circuit fault has occurred in the first set of LEDs, wherein the voltage sensing circuit includes a first resistor, a second resistor, a diode, and a capacitor, wherein the first resistor, the second resistor, and the diode reduce the potential across the first LED and the capacitor filters the reduced potential, and wherein the voltage sensing circuit provides the reduced and filtered potential to the controller; and a controller connected to the voltage sensing circuit and the switching component to activate the switching component when the reduced and filtered potential indicates that an open circuit fault has occurred in the first set of LEDs.

16. The lamp system of claim 15 wherein the switching component is a first switching component, and further comprising a second switching component connected in parallel with the second set of LEDs, the second switching component having an active state and an inactive state, wherein the second switching component diverts the drive current from the second set of LEDs when the switching component is in the active state, and wherein the controller is further configured to selectively activate the second switching component.

17. The lamp system of claim 16 wherein in the lamp system is a headlamp system for a vehicle having a low beam operating mode and a high beam operating mode, wherein the controller is further configured to activate the first switching component when the headlamp system is operating in the low beam operating mode and wherein the controller is further configured to activate the second switching component when the headlamp system is operating in the high beam operating mode.

18. The lamp system of claim 15 wherein the controller is further configured for selectively activating the switching component at a frequency and a duty cycle in order to vary an intensity of the first set of LEDs.

* * * * *